UNITED STATES PATENT OFFICE.

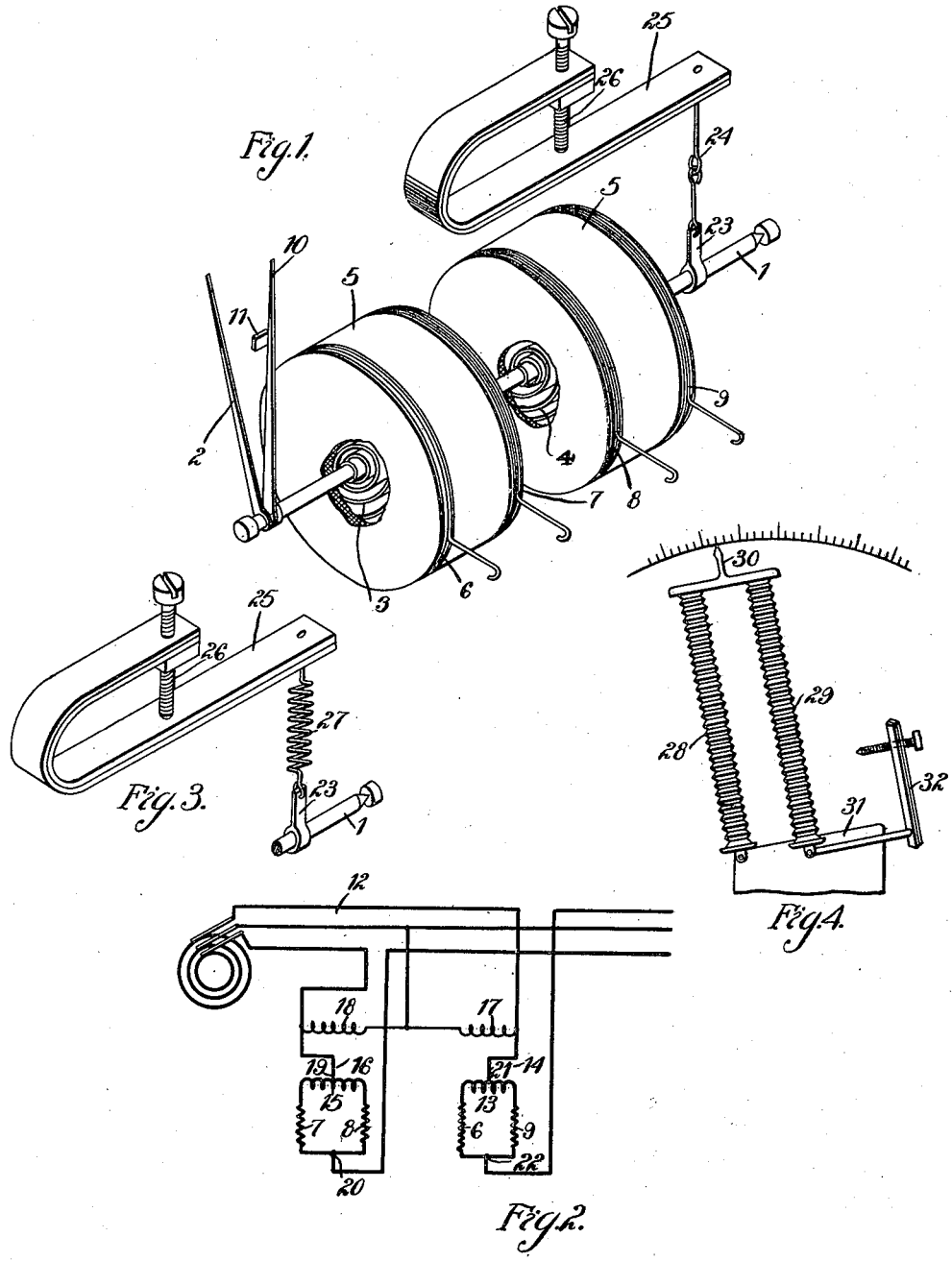

PAUL M. LINCOLN, OF PITTSBURGH, PENNSYLVANIA.

MAXIMUM-DEMAND METER.

1,425,665.     Specification of Letters Patent.     Patented Aug. 15, 1922.

Application filed July 10, 1918. Serial No. 244,279.

*To all whom it may concern:*

Be it known that I, PAUL M. LINCOLN, a citizen of the United States, and a resident of Pittsburgh, in the county of Allegheny and State of Pennsylvania, have invented a new and useful Improvement in Maximum-Demand Meters, of which the following is a specification.

My invention relates to electrical measuring instruments and particularly to thermal demand meters.

One object of my invention is to provide means for correcting the indications of an instrument, of the above-indicated character, to compensate for the heat radiated from the actuating means of the same.

Another object of my invention is to provide a control spring for an instrument, of the above-indicated character, that shall cause the pointer of the instrument to vary proportionate amounts in its indications over its entire scale without affecting its initial indication and also to correct for the heat radiated from the actuating means of the instrument.

Another object of my invention is to provide a device of the above-indicated character that shall be adapted to inherently correct the faulty operation of the instrument caused by changes in voltage and power factor.

A further object of my invention is to provide a controlling device of the above-indicated character that shall be simple and inexpensive to construct and effective in its operation.

Copending application serial No. 183,333, filed July 28, 1917, by B. H. Smith and assigned to the Westinghouse Electric and Manufacturing Company, discloses a control spring that is attached to a lever arm which is mounted on the shaft of a thermal demand meter for the purpose of adjusting the full-load indications of the instrument without affecting the initial indication of the same. That is, by the use of a spring connected in the manner shown in this application, no turning moment is imparted to the shaft at the initial position of the pointer, but proportionate turning moments are imparted to the shaft when the shaft is in other than its initial position. Thus, printed or stock scales may be used and it is only necessary to adjust the full load indication of the instrument by tensioning the spring in order to obtain correct indications throughout the range of the instrument.

In my invention, I employ the principle set forth in the above-mentioned application but I further cause the spring to be responsive to changes in temperature in order that the indications of the instrument may be corrected for the heat radiated from the thermal-operating devices of the same. Since the spring is responsive to changes in temperature in the instrument, and since changes in power factor and voltage applied to the instrument change the heating of the instrument and, consequently, the temperature of the same, slight errors that are caused by voltage and power-factor variations may be compensated by my present device.

Figure 1 of the accompanying drawings is a diagrammatic perspective view of a thermal demand meter embodying my invention; Fig. 2 is a diagrammatic view of the connection of the meter shown in Fig. 1 to an electric circuit, and Figs. 3 and 4 are diagrammatic views of modified forms of my invention.

The meter embodying my invention is preferably constructed in accordance with the meter shown in Patent No. 1,300,283, filed April 5, 1917, by P. M. Lincoln and B. H. Smith and assigned to the Westinghouse Electric & Manufacturing Company, and comprises a shaft 1 upon which is mounted a pointer 2 and two oppositely acting thermal elements 3 and 4. The thermal elements 3 and 4 comprise bimetallic springs, the inner ends of which are connected to the shaft 1 and the outer ends of which are connected to stationary casings 5. Windings 6 and 7 are disposed at the respective sides of the casing 5 of the device 3 and windings 8 and 9 are disposed at the respective sides of the casing 5 of the device 4. A pointer 10 is loosely mounted on the shaft 1 and is provided with a projection 11 that is engaged by the pointer 2 for the purpose of actuating the same. The pointer 10 constitutes a maximum-demand pointer and is adapted to be retained in the position to which it is moved by the pointer 2 for the purpose of indicating the maximum demand of the power traversing the instrument.

The windings 6, 7, 8 and 9 are disposed at the sides of the members 3 and 4 and are adapted to maintain an equalizing temperature in the same that will vary in accordance with the square of the sum and the difference of the currents and voltages of two phases of a three-phase electric circuit 12. The connection of the windings 6, 7, 8 and 9 may be best understood by reference to Fig. 2 of the drawings where the windings 6 and 9 are shown as connected, in series relation, to the winding 13 of a transformer 14 and the windings 7 and 8 are connected in series relation to the winding 15 of a transformer 16. The winding 17 of the transformer 14 is connected, in shunt relation, to the conductors of one phase of the circuit 12, the power traversing which is to be measured, and the winding 18 of the transformer 16 is connected, in shunt relation, to the conductors of the other circuit 12. The windings 7 and 8 are connected, in series relation, to one of the conductors of the circuit 12 but in parallel relation to each other by means of a mid-point connection at 20 between opposite terminals. Similarly, the windings 6 and 9 are connected, in series relation, to another conductor of the circuit 12 but in parallel relation to each other by like mid point connections 21 and 22.

With the windings 6 and 9 connected as shown in Fig. 2 of the drawings, current will be supplied thereto in accordance with the sum and the difference of the current and voltage traversing one phase of the circuit 12. Since the windings 6 and 7 are associated with the device 3, the same will be heated in accordance with the square of the sum of the currents and voltages of both phases of the circuit 12 and, since the device 4 is associated with the windings 8 and 9, it will be heated in accordance with the square of the difference of the currents and voltages of both phases of the circuit 12. Consequently, since the devices 3 and 4 are opposed in their action upon the shaft 1, the result of the thermal effects of the same will be proportional to the power traversing the circuit 12.

As shown in Fig. 1 of the drawings, lever arm 23 is mounted on the shaft 1 and is connected, through flexible means 24, to a bimetallic spring member 25 having an adjusting screw 26. The lever arm 23 is in such position with respect to the shaft 1 that the force of the spring 25 is applied in alignment therewith when the pointer 2 is in its initial position, and thus, irrespective of the tension on the spring 25, no turning moment will be imparted to the shaft 1 when the pointer 2 is in its initial position. However, the restoring action of the spring 25 on the shaft 1 will vary substantially in proportion to the movement of the shaft and thus in proportion to the power to be measured. This permits a printed scale to be used, and it is only necessary to adjust the screw 26 when full-load current traverses the instrument to cause the pointer 2 to register with the full-load indication on the scale. When the spring 25 is so adjusted, the pointer 2 will indicate correctly at all other points on the scale, and its zero indication will not be affected.

The bimetallic spring 25, being disposed adjacent to the members 3 and 4, will be subjected to the radiated heat therefrom and, on increase in temperature, will flex downwardly at its outer end to lessen the tension on the lever arm 23.

It has been found that, at high temperatures, the instrument tends to read low, therefor, by lessening the tension on the lever arm 23, the pointer 2 is accordingly advanced and the reading of the instrument is corrected.

In addition to compensating for the temperature variations, the use of the spring 25 has the further advantage that it tends to compensate for errors that would otherwise occur by reason of voltage and power-factor changes. That is, a thermal demand meter ordinarily has a relatively slight error due to changes in voltage, indicating low when the voltage is high and indicating high when the voltage is low. As the voltage on the meter increases, the losses therein increase, thereby raising the internal temperature of the meter and causing the spring 25 to lessen the tension on the lever arm 23, as above described. Similarly, as the power factor decreases, the temperature of the devices 3 and 4 increases for a given difference in the power input to cause the device to absorb relatively more heat under conditions of low power factor. The fact that the total losses increase under low power-factor, conditions will tend to increase the internal temperature and, therefore, heat the spring 25 to cause the same to compensate for changes in power factor.

As shown in Fig. 3 of the drawings, a spring 27 is disposed between the lever-arm 23 and the bimetallic-spring 25. With this arrangement, the spring 27 so controls the pointer of the instrument that its indications are proportionate over its entire range of movement, and the bimetallic spring 25 merely corrects for temperature changes by varying the tension of the spring 27.

As shown in Fig. 4 of the drawings, my invention is applied to a thermal-demand meter constructed in accordance with Patent #1,156,412 granted to me, Oct. 12, 1915. In this device, two expansible members 28 and 29 are heated substantially as set forth with respect to the device shown in Fig. 1, and the pointer 30 is actuated in accordance with the differential expansion of the two members 28 and 29. The lower end of the member 29 may be moved along the supporting member 31 to so adjust the instrument that its indications are proportional over its entire scale. A bimetallic member 32 is provided for automatically adjusting the position of the lower end of the member 29 to compensate for the heat radiated from the members 28 and 29, and the changes in ambient temperature are substantially as described with respect to the device shown in Fig. 1.

One of the features of my invention is that the force of an adjustable bimetallic spring is applied through a lever arm that is placed in such position on the shaft of the instrument that no turning force is exerted on the shaft when the same is in its initial position. Since the bimetallic spring is placed adjacent the thermal actuating devices of the instrument, the same may have the combined properties of constituting a control spring for permitting the use of printed scales and for compensating for the heat radiated from the actuating device under various conditions.

My invention is not limited to the particular devices illustrated, as it may be variously modified without departing from the spirit and scope of the invention as set forth in the appended claims.

I claim as my invention:

1. A measuring instrument comprising a shaft, a pointer on the shaft, opposing thermal-responsive means for actuating the shaft, and means for adjusting the indications of the pointer in accordance with the heat radiated from the thermal-responsive means.

2. A measuring instrument comprising an indicating member, opposing thermal-responsive means for actuating the indicating member and a single means for applying a retarding force on the indicating member normally in direct alignment with its initial position for causing the indications thereof to be directly proportional throughout and automatically responsive to changes in the ambient temperature to correct the readings of the instrument in accordance therewith.

3. A measuring instrument comprising a shaft, a pointer mounted thereon, means for actuating the shaft and a single thermal-responsive control spring therefor exerting a turning force on the pointer when the pointer is in any position except its initial position.

4. A measuring instrument comprising a shaft, a pointer thereon, thermal-responsive means for actuating the shaft and a thermal-responsive spring for normally exerting a force against turning of the shaft when the pointer is in its initial position and automatically correcting the instrument readings in accordance with temperature changes.

5. In a measuring instrument, the combination with a shaft, a pointer on the shaft, and two bimetallic members for actuating the shaft in accordance with the differential effect of the heating thereof, of a lever arm mounted on the shaft, and thermal-responsive means for yieldingly applying a restraining force thereto and automatically correcting the instrument readings in accordance with temperature changes.

6. In a measuring instrument, the combination with a shaft, a pointer on the shaft, and two bimetallic members for actuating the shaft in accordance with the differential effect of the heating thereof, of a lever-arm mounted on the shaft, and a bimetallic spring operatively connected to the lever arm to oppose the movement of the shaft and to be automatically corrected in its opposing movement in accordance with temperature changes.

7. In a measuring instrument, the combination with a shaft having a pointer thereon, and differentially acting thermal means for actuating the shaft, of a lever-arm mounted on the shaft, and a single resilient means for controlling the movement of the pointer to cause it to move by proportionate increments for given increments of applied force and that responds to temperature changes to correct its controlling movement in accordance with temperature changes.

8. In a measuring instrument, the combination with a shaft having a pointer thereon and thermal-responsive means for actuating the shaft, of means for correcting the indication of the pointer in accordance with heat-radiation changes in the thermal-responsive means.

9. In a measuring instrument, the combination with a pointer and opposing bimetallic means for actuating the pointer, of a bimetallic spring for opposing the operation of the pointer, said spring being responsive to the heat radiated from said bimetallic means to correct the instrument readings in accordance with the changes in said radiation.

10. In a measuring instrument, the combination with a shaft, a pointer thereon and opposing bimetallic means for actuating the shaft, of a bimetallic spring for opposing the operation of the shaft, said spring being automatically corrected in its opposing movement in accordance with changes in the ambient temperature.

11. In a measuring instrument, the combination with a pointer and opposing heat-responsive means for actuating the pointer, of means for controlling the indications of the pointer, said controlling means being responsive to the heat radiated from the heat-responsive means and corrected in its controlling movement in accordance with said radiation.

In testimony whereof, I have hereunto subscribed my name this 22nd day of June 1918.

PAUL M. LINCOLN.